United States Patent
Abiko et al.

(10) Patent No.: US 6,606,534 B1
(45) Date of Patent: Aug. 12, 2003

(54) STRIP THICKNESS CONTROL APPARATUS FOR ROLLING MILL

(75) Inventors: Youji Abiko, Kakogawa (JP); Mamoru Sawada, Kakogawa (JP); Tomohiro Kanai, Kakogawa (JP); Tomoyuki Tezuka, Fuchu (JP); Kunio Sekiguchi, Kawagoe (JP); Takumi Sato, Maryville, TN (US)

(73) Assignee: Kabushiki Kaisha Toshiba (JP)

( * ) Notice: Subject to any disclaimer, the term of this patent is extended or adjusted under 35 U.S.C. 154(b) by 300 days.

(21) Appl. No.: 09/708,708

(22) Filed: Nov. 9, 2000

(30) Foreign Application Priority Data

Nov. 12, 1999 (JP) ............................................ 11-322392

(51) Int. Cl.[7] ............................................. G06F 19/00
(52) U.S. Cl. ....................................... 700/155; 700/150
(58) Field of Search ................................ 700/148, 150, 700/151, 155, 156; 72/365.2, 366.2

(56) References Cited

U.S. PATENT DOCUMENTS

| 4,648,257 | A | * | 3/1987 | Oliver et al. | .................. | 72/9.2 |
| 4,850,211 | A |   | 7/1989 | Sekiguchi et al. | ................ | 72/8 |
| 5,761,066 | A | * | 6/1998 | Lettau et al. | ................ | 700/155 |
| 6,286,348 | B1 | * | 9/2001 | Sekiguchi et al. | ............ | 72/9.2 |

FOREIGN PATENT DOCUMENTS

| JP | 59-092113 | 5/1984 |
| JP | 11077128 A | * 3/1999 | ........... B21B/37/18 |

OTHER PUBLICATIONS

Miki et al., "Development Of New Roll Eccentricity Control", Nisshin Steel Technical Report, pp. 77–84, (1984).

* cited by examiner

Primary Examiner—Leo Picard
Assistant Examiner—Ryan Jarrett (57) ABSTRACT

A strip thickness control apparatus for a rolling mill includes a strip thickness gauge provided on a delivery side of the rolling mill, a moving distance calculating module for calculating a moving distance of the strip from the rolling mill, a rolling roll angle-of-rotation calculating module for calculating an angle of rotation of the rolling roll, a strip thickness deviation calculating module for calculating a deviation of the strip thickness from a target value of the measured value of the strip thickness, a strip thickness deviation storage module for storing the strip thickness deviation by adding it for every angle of rotation of the rolling roll, a strip thickness deviation input determining module for determining an input timing for inputting the strip thickness deviation to the strip, thickness deviation storage, a strip thickness deviation output determining module for determining an output timing for outputting the strip thickness deviation stored in the strip thickness deviation storage module, and a manipulated variable calculating module for fetching the strip thickness deviation at the output timing determined and determining a manipulated variable of a roll gap controller.

20 Claims, 6 Drawing Sheets

FIG. 1

0~N-1 : SEGMENT NUMBER
1 : BACKUP ROLL
N : NUMBER OF SEGMENTATIONS

FIG.2

21 : TABLE

| SEGMENT NUMBER | 0 | 1 | ... | N-1 |
|---|---|---|---|---|
| DISTANCE [mm] FROM ROLLING MILL | $L_0$ | $L_1$ | ... | $L_{N-1}$ |

FIG.3

22 : TABLE

| SEGMENT NUMBER | 0 | 1 | ... | N-1 |
|---|---|---|---|---|
| SUM [mm] OF STRIP THICKNESS DEVIATIONS | $\Delta H_0$ | $\Delta H_1$ | ... | $\Delta H_{N-1}$ |

STRIP THICKNESS CONTROL APPARATUS FOR ROLLING MILL

BACKGROUND OF THE INVENTION

1. Field of the Invention

The present invention relates generally to a rolling mill for rolling metals etc, and more particularly to a strip thickness control apparatus for a rolling mill that restrains fluctuations in strip thickness due to an eccentricity of a rolling roll (which will hereinafter simply termed a roll eccentricity).

2. Related Background Art

The roll eccentricity is one of factors that cause disturbances in controlling a strip thickness when rolling the metal etc. Major factors causing the roll eccentricity are:

(1) an influence of a bearing key of a backup roll,
(2) a deviation of an axial core of the backup roll, and
(3) incomplete roundness of a work roll.

If a rolling velocity is fixed, a strip thickness on the delivery side is periodically fluctuated.

There are proposed a variety of control methods of reducing the influence of this roll eccentricity upon the strip thickness. A typical method thereof is that a rolling force is detected as a function of an angle of rotation of the roll, a roll eccentricity is obtained based on this detected value, and a roll gap controller is operated so as to cancel this roll eccentricity. This method must involve so-called kiss-roll in order to detect the rolling force, wherein the upper and lower rolls are brought into contact with each other while being rotated in a state of having no strip.

The kiss-roll is not, however, easy to perform in such a type of rolling mills that consecutive rolling operations are carried out as in tandem rolling, and it is therefore difficult to apply the prior art method described above. Further, as the rolling advance, a state of the roll changes, and a quantity of the roll eccentricity varies. The conventional method is, however, incapable of corresponding to these changes.

SUMMARY OF THE INVENTION

It is a primary object of the present invention, which was devised to obviate the problems inherent in the prior art, to provide a strip thickness control apparatus for a rolling mill that is capable of reducing an influence of a roll eccentricity upon a strip thickness even in the rolling mill incapable of easily performing the kiss-roll, and of corresponding to a change in the roll eccentricity as the rolling advances.

To accomplish this object, a strip thickness control apparatus for a rolling mill comprises a strip thickness gauge, provided on a delivery side of the rolling mill, for measuring a thickness of a strip, a moving distance calculating module for calculating a moving distance of the strip from the rolling mill, a rolling roll angle-of-rotation calculating module for calculating an angle of rotation of the rolling roll, a strip thickness deviation calculating module for calculating a deviation of the strip thickness from a target value of the measured value of the strip thickness by the strip thickness gauge, a strip thickness deviation storage module for storing the strip thickness deviation by adding it for every angle of rotation of the rolling roll, a strip thickness deviation input determining module for determining an input timing for inputting the strip thickness deviation to the strip thickness deviation storage module on the basis of the moving distance of the strip and the angle of rotation of the rolling roll, a strip thickness deviation output determining module for determining an output timing for outputting the strip thickness deviation stored in the strip thickness deviation storage module on the basis of the angle of rotation of the rolling roll, and a manipulated variable calculating module for fetching the strip thickness deviation stored in the strip thickness deviation storage module at the output timing determined by the strip thickness deviation output determining module, and determining a manipulated variable of a roll gap controller of the rolling mill, which eliminates the strip thickness deviation.

DESCRIPTION OF THE PREFERRED EMBODIMENTS

Preferred embodiments of the present invention will hereinafter be discussed in depth referring to the accompanying drawings.

Figure 1:
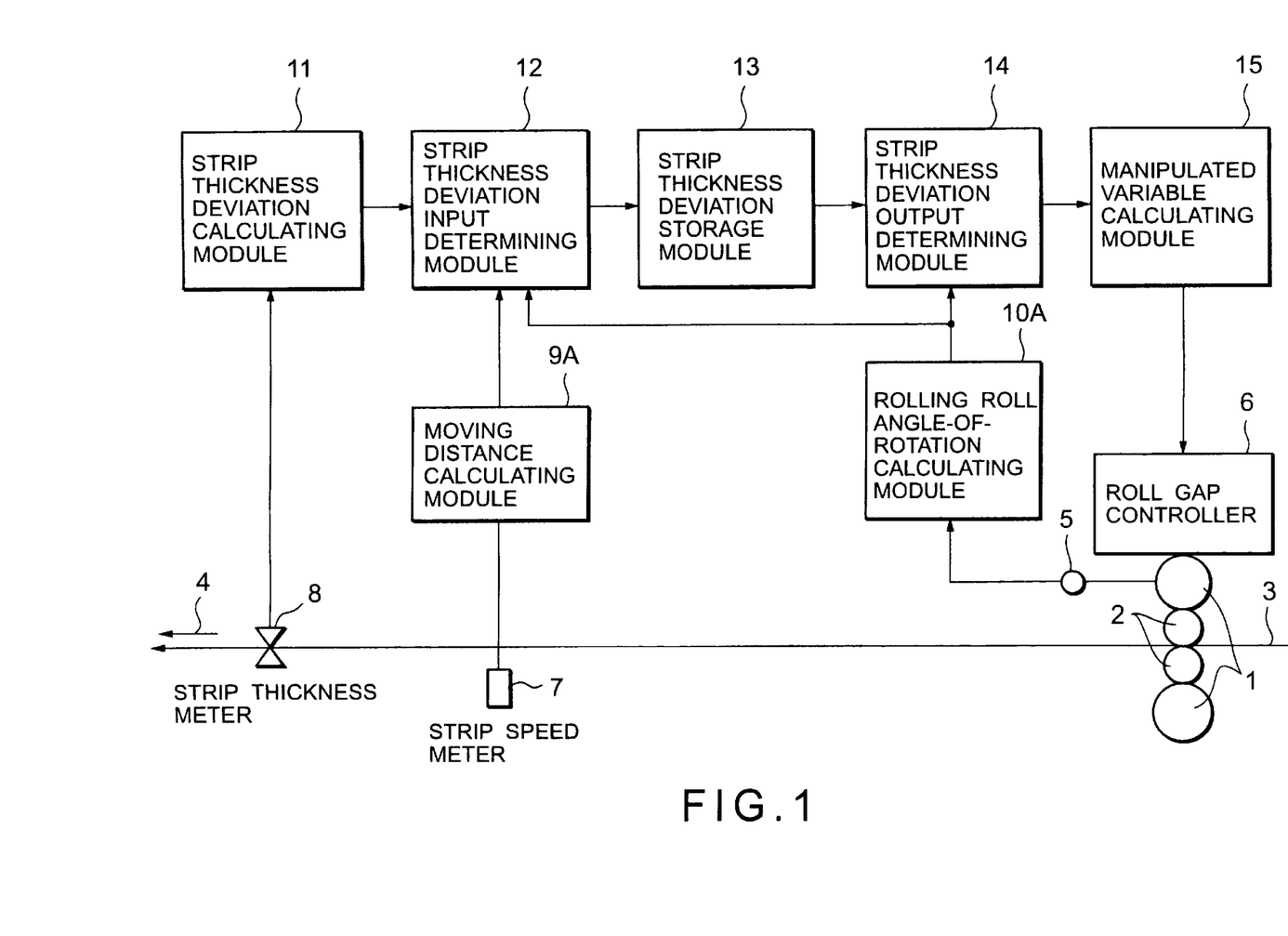
FIG. 1 is a block diagram showing a configuration of a plate thickness control apparatus for a rolling mill in a first embodiment of the present invention, in combination with the rolling mill defined as an application target.

FIG. 1 is a block diagram showing a configuration of a plate thickness control apparatus for a rolling mill in a first embodiment of the present invention, in combination with the rolling mill defined as an application target. Referring to FIG. 1, the rolling mill is includes a couple of backup rolls and a couple of work rolls 2, interposed therebetween, for directly rolling s trip, thus constituting a well-known 4-stage rolling mill. A strip 3 is rolled in an arrow direction 4.

In this case, the work rolls 2 are driven by an unillustrated electric motor. An angle-of-rotation detector 5 incorporating, e.g., a pulse generator and a counter, for detecting an angle of rotation through a predetermined fiducial point of the backup roll, is linked to the backup roll. Further, the rolling mill has a roll gap controller 6 for controlling a roll gap thereof. A strip speed meter 7 for measuring a moving speed of the strip and a strip thickness gauge 8 for measuring a thickness of the strip, are provided on the delivery side of the rolling mill.

A measured value of the strip speed meter 7 is supplied to a moving distance calculating module 9A. The moving distance calculating module 9A, based on the moving speed measured by the strip speed meter 7, calculates a moving distance of the strip 3 within a predetermined time. A detected value of the angle-of-rotation detector 5 is supplied to a rolling roll angle-of-rotation calculating module 10A. The rolling roll angle-of-rotation calculating module 10A, based on a detected angle of rotation, calculates an angle of rotation of the backup roll 1 from the fiducial point. A measured value of the strip thickness gauge 8 is supplied to a strip thickness deviation calculating module 11. The strip thickness deviation calculating module 11 compares a measured value of the strip thickness with a target value of the strip thickness, thereby calculating a deviation of the strip thickness.

The moving distance outputted from the moving distance calculating module 9A, the angle of rotation of the backup roll 1 that is outputted from the rolling roll angle-of-rotation calculating module 10A and the strip thickness deviation outputted from the strip thickness deviation calculating module 11, are each supplied to a strip thickness deviation input determining module 12. The strip thickness deviation input determining module 12 determines a timing for inputting the strip thickness deviation to a strip thickness deviation storage module 13 provided on the delivery side thereof. The strip thickness deviation input determining module 12, when determining this timing, adds the moving distance calculated by the moving distance calculating module 9A, and, at the moment when the rolling portion of the backup-roll 1 at each angle of rotation passes through a position where the strip thickness gauge 8 is provided, inputs the strip thickness deviation together with angle-of-rotation data of the backup roll 1 to the strip thickness deviation storage module 13.

Herein, the angle-of-rotation data corresponds to a segment number given when the backup roll 1 is equally segmented into a multiplicity of segments in its peripheral direction. The strip thickness deviation input determining module 12 is so constructed as to include a table capable of updating and storing the distance given from the rolling mill in a way of making each distance corresponding to the segment number. The strip thickness deviation storage module 13 is also so constructed as to include a table capable of updating and storing the strip thickness deviation in a way of making the deviation corresponding to the segment number. Then, the strip thickness deviation input determining module 12, when the angle of rotation of the backup roll 1 comes to an angle of rotation corresponding to the segment number, clears the distance corresponding to the segment number. The strip thickness deviation storage module 13, each time the strip thickness deviation corresponding to the segment number of the backup roll 1 is inputted, calculates a sum of a previously stored strip thickness deviation and a newly inputted strip thickness deviation, and updates and stores the obtained value as a strip thickness deviation.

A strip thickness deviation output determining module 14 for determining an output timing of the strip thickness deviation stored in the strip thickness deviation storage module 13, is connected to this strip thickness deviation storage module 13. The strip thickness deviation output determining module 14 reads the strip thickness deviation corresponding to the angle of rotation from the fiducial point that is calculated by the rolling roll angle-of-rotation calculating module 10A, i.e., the strip thickness deviation corresponding to the segment number, and supplies this deviation to a manipulated variable calculating module 15. The manipulated variable calculating module 15 determines a manipulated variable of the roll gap controller 6, which serves to modify the strip thickness deviation supplied thereto, and supplies the thus determined manipulated variable to the roll gap controller 6.

Note that the above moving distance calculating module 9A, the rolling roll angle-of-rotation calculating module 10A, the strip thickness deviation calculating module 11, the strip thickness deviation input determining module 12, the strip thickness deviation storage module 13, the strip thickness deviation output determining module 14 and the manipulated variable calculating module 15, are what their functions are incorporated into a computer.

An operation of the first embodiment having the construction described above, will hereinafter be described.

The strip 3 is rolled by the rolling mill, and its moving speed is measured by the strip speed meter 7 provided on the delivery side of the rolling mill. The strip thickness is measured by the strip thickness gauge 8. The moving distance calculating module 9A calculates, from the speed of the strip 3 that is measured by the strip speed meter 7, a distance at which the strip 3 advances during a calculation period of the computer in the following equation:

$$\Delta L = \qquad (1)$$

where $\Delta L$ is a moving distance [mm] of the strip during one calculation period, v is a speed [mpm] of the strip, and $\Delta \tau$ is a calculation period [sec].

Figure 2:
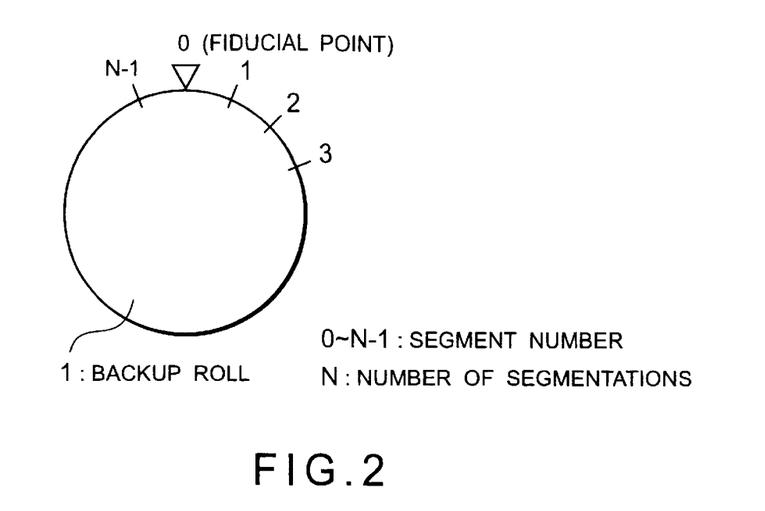
FIG. 2 is an explanatory diagram for explaining an operation in the first embodiment illustrated in FIG. 1, showing how a backup roll is segmented and where segment numbers are given.

Herein, the backup roll 1 is, as illustrated in FIG. 2, virtually segmented into N-pieces of segments in the peripheral direction, and, a position of the fiducial point being set to 0, the respective segment points are given segment numbers such as 0, 1, 2, . . . , N–1. Then, the rolling roll angle-of-rotation calculating module 10A outputs an angle-of-rotation detecting signal corresponding to a rotation of the backup roll 1.

The strip thickness deviation calculating module 11, based on the strip thickness measured value of the strip thickness gauge 8, calculates a strip thickness deviation in the following equation:

$$\Delta h = h^{REF} - h^{MEAS} \qquad (2)$$

where $\Delta h$ is a strip thickness deviation [mm], $h^{REF}$ is a strip thickness target value (or a value stored) [mm], and $h^{MEAS}$ is a strip thickness measured value [mm].

Figure 3:
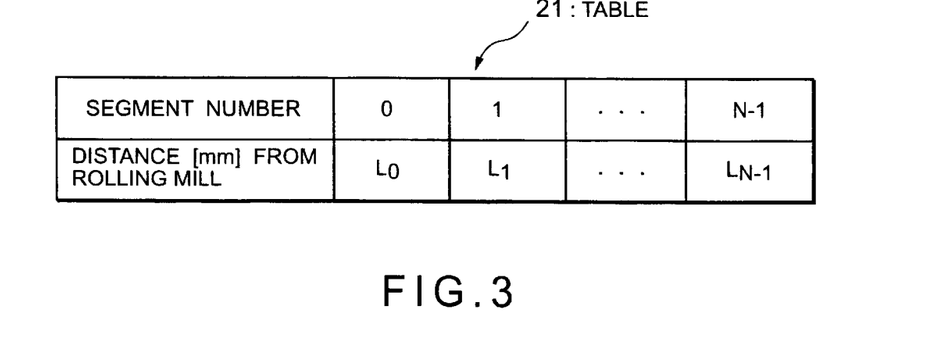
FIG. 3 is an explanatory diagram showing a structure of a table of a strip thickness deviation input determining module as a component in the first embodiment illustrated in FIG. 1.

The strip thickness deviation input determining module 12 has, as shown in FIG. 3, a table 21 capable of storing N-pieces of elements corresponding to the number-of-segmentations N of the backup roll 1. The table 21 is sequentially update-stored with from-the-rolling-mill distances of the strip areas rolled by the portions, identified by the segment numbers n (n=0~n–1), of the backup roll 1 in a way of making these distances corresponding to the segment numbers.

Then, to start with, the strip thickness deviation input determining module 12 updates and stores a moving distance $\Delta L$ calculated by the moving distance calculating module 9A at a calculation timing in accordance with the following equation:

$$L_n[k] = L_n[k-1] + \Delta L[k] \, (n=0 \sim N-1) \qquad (3)$$

where $L_n[k]$ is a distance [mm] from the a portion of rolling mill that corresponds to the segment number n at a control cycle k, $L_n[k-1]$ is a distance from the portion of the rolling mill that corresponds to the segment number n at a control cycle k−1, and $\Delta L[k]$ is a moving distance [mm] at the control cycle k, which is calculated moving distance calculating module.

Next, the strip thickness deviation input determining module 12 judges a timing for inputting the strip thickness deviation to the strip thickness deviation storage module 13. Now, it is assumed that there be finished the inputting of the strip thickness deviation to a storage area corresponding to a segment number n−1 (n=0, 1, . . . , N−1) of the strip thickness deviation storage module 13. At this time, the strip thickness deviation input determining module 12 judges whether or not the timing for inputting the strip thickness deviation to a storage area corresponding to the segment number n is reached. Then, when satisfying the following formula, the strip thickness deviation input determining module 12 determines that it is the timing for inputting the strip thickness deviation to the storage area corresponding to the segment number n.

$$L_n[k] \geq L_x \quad (4)$$

where $L_n[k]$ is a distance from a portion of the rolling mill that corresponds to the segment number n, and $L_x$ is a distance between the rolling mill and the strip thickness gauge 8 provided on the delivery side thereof.

Herein, if the formula (4) is not satisfied, it is again judged at a next calculation timing whether or not there is reached the timing for inputting the strip thickness deviation to the storage area corresponding to the segment number n.

Next, the strip thickness deviation input determining module 12, when the angle of rotation of the backup roll 1 that is calculated by the rolling roll angle-of-rotation calculating module 10A reaches an angle of rotation corresponding to the segment number n, clears the distance from the rolling mill as seen in the following equation:

$$L_n[k] = 0 \quad (5)$$

With a series of operations described above, it is known which segment number the portion of the backup roll 1 that rolls the strip when obtaining the strip thickness measured by the strip thickness gauge 8, corresponds to.

Incidentally, the operation of the strip thickness deviation input determining module 12 does not take account of a delay in measurement by the strip thickness gauge 8. Therefore, the control might be oscillatory depending on how much the measurement is delayed. Further, delays in transmission of the signal and in calculation might occur. The following is a discussion on a method of compensating these delays, wherein the delay in the measurement by the strip thickness gauge 8 is defined as a primary delay.

The method of compensating the delays in the measurement by the stripe thickness gauge 8 and so on, may be contrived in two ways such as:

(1) compensating it with an initial value of the distance from the rolling mill, and (2) compensating it when determining the input timing.

According to the method (1) of these methods, i.e., in the case of compensating the delay with the initial value of the distance from the rolling mill, this is determined not by setting Ln=0 as expressed by the formula (5) but by the following formulae.

$$L_n = -\frac{D_{BUR} \cdot \phi \cdot (1+f)}{2} \quad (6)$$

$$\phi = \tan^{-1}(\omega \cdot T_x) + \omega \cdot T_d \quad (7)$$

where $L_n$ is a distance [mm] from the portion of the rolling mill that corresponds to the segment number n, $D_{BUR}$ is a diameter [mm] of the backup roll, f is a forward slip [−], ω is an angle speed [rad/sec] of the backup roll, $T_x$ is a time constant of the strip thickness gauge, and $T_d$ is a delay [sec] in transmission of the signal or in calculation.

Herein, the angular speed ω of the backup roll can be obtained by, for example, taking a difference in the angle of rotation calculated by the rolling roll angle-of-rotation calculating module 10A.

On the other hand, according to the method (2), viz., for compensating the delay when determining the input timing, the input timing is determined by use of the following formulae in place of the formula (4).

$$L_n - \tfrac{1}{2} D_{BUR} \cdot \phi \cdot (1+f) \geq L_x \quad (8)$$

$$\phi = \tan^{-1}(\omega \cdot T_x) + \omega \cdot T_d \quad (9)$$

Accuracy can be enhanced by compensating the delay in the measurement by the strip thickness gauge 8 in the way described above.

Figure 4:
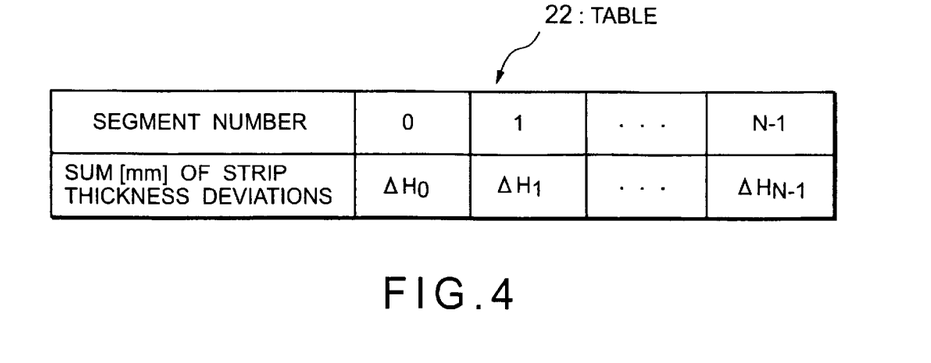
FIG. 4 is an explanatory diagram showing a structure of a table of a strip thickness deviation storage module as a component in the first embodiment illustrated in FIG. 1.

Next, an operation of the strip thickness deviation storage module 13 will be explained. This strip thickness deviation storage module 13 also includes a table 22 having a similar structure as that of the strip thickness deviation input determining module 12. Then, the strip thickness deviation is stored in a storage area corresponding to a segment number, and each time a new strip thickness deviation is inputted, this value is added and update-stored. For instance, when at an input timing with the segment number n, a calculation in the following equation is carried out, and the result is stored fresh as a sum of the strip thickness deviations with respect to the segment number n.

$$\Delta H_n[k] = \Delta H_n[k-1] + \Delta h[k] \quad (10)$$

where $\Delta H_n[k]$ is a sum [mm] of the strip thickness deviations with respect to the segment number n, and $\Delta h[k]$ is a strip thickness deviation [mm] at the control cycle k calculated by the strip thickness deviation calculating module.

Next, the strip thickness deviation output determining module 14 determines a timing for outputting the sum of the strip thickness deviations in the strip thickness deviation storage module 13. Namely, the strip thickness deviation output determining module 14, when the angle of rotation of the backup roll 1 that is calculated by the rolling roll angle-of-rotation calculating module 10A comes to an angle of rotation corresponding to the segment number, determines the timing for outputting the sum of the strip thickness deviations, which corresponds to that segment number. At this time, as by the strip thickness deviation input determining module 12, it is required that a delay in response of the roll gap controller 6 be compensated. Supposing that this response delay of the roll gap controller 6 is defined as a primary delay, for example, the output timing with respect to the segment number n is determined by the following formula:

$$\theta + \phi \geq \theta_n \quad (11)$$

$$\phi = \tan^{-1}(\omega \cdot T_{HPC}) \quad (12)$$

where θ is an angle of rotation [rad] of the backup roll, $θ_n$ is an angle of rotation [rad] of the backup roll that corresponds to the segment number n, ω is an angular speed [rad/sec] of the backup roll, and $T_{HPC}$ is a time constant [sec] of the roll gap controller.

Herein, the angular speed of the backup roll may be obtained by taking a difference of the angle of rotation calculated by the rolling roll angle-of-rotation calculating module 10A.

Finally, the manipulated variable calculating module 15 calculates a manipulated variable of the roll gap controller 6 at the output timing determined by the strip thickness deviation output determining module 14. For instance, if it is an output timing corresponding to the segment number n, the manipulated variable calculating module 15 executes a calculation in the following equation, and outputs this manipulated variable to the roll gap controller 6.

$$\Delta S = k \cdot \frac{M+Q}{M} \cdot \Delta H_n \quad (13)$$

where ΔS is the manipulated variable [mm] of the roll gap controller, k is an adjustment gain [-], M is a mill constant [ton/mm] of the rolling mill, Q is a plastic coefficient [ton/mm] of the strip, and $\Delta H_n$ is a sum of the strip thickness deviations with respect to the segment number n.

Note that if the angular speed of the backup roll changes, the manipulated variable of the roll gap controller is calculated by multiplying a coefficient as in the following formula:

$$\Delta S = k(\omega) \cdot k \cdot \frac{M+Q}{M} \cdot \Delta H_n \quad (14)$$

where k(ω) is a coefficient that changes corresponding to the angular speed of the backup roll.

With this contrivance, the manipulated variable can be increased or decreased when at a specified angular speed.

Further, the manipulated variable calculating module 15 sets upper and lower limit values of the manipulated variable of the roll gap controller 6, which is obtained by the formula (13) or (14). The manipulated variable calculating module 15, if over or under a range thereof, sets the manipulated variable to the upper or lower limit value. To be more specific, if the following formula (15) is not met, $$b^{LL} \leq \Delta S \leq b^{UL} \quad (15)$$

and when $\Delta S < b^{LL}$, $$\Delta S = b^{LL} \quad (16)$$

When $\Delta S > b^{UL}$, $$\Delta S = b^{UL} \quad (17)$$

where $b^{LL}$ is the lower limit value [-], and $b^{UL}$ is the upper limit value.

Thus, in accordance with the first embodiment illustrated in FIG. 1, it is feasible to reduce an influence of roll eccentricity due to the backup roll 1 upon the strip thickness of the strip 3, and further to correspond to a change in the roll eccentricity that might occur as the rolling process advances.

Figure 5:
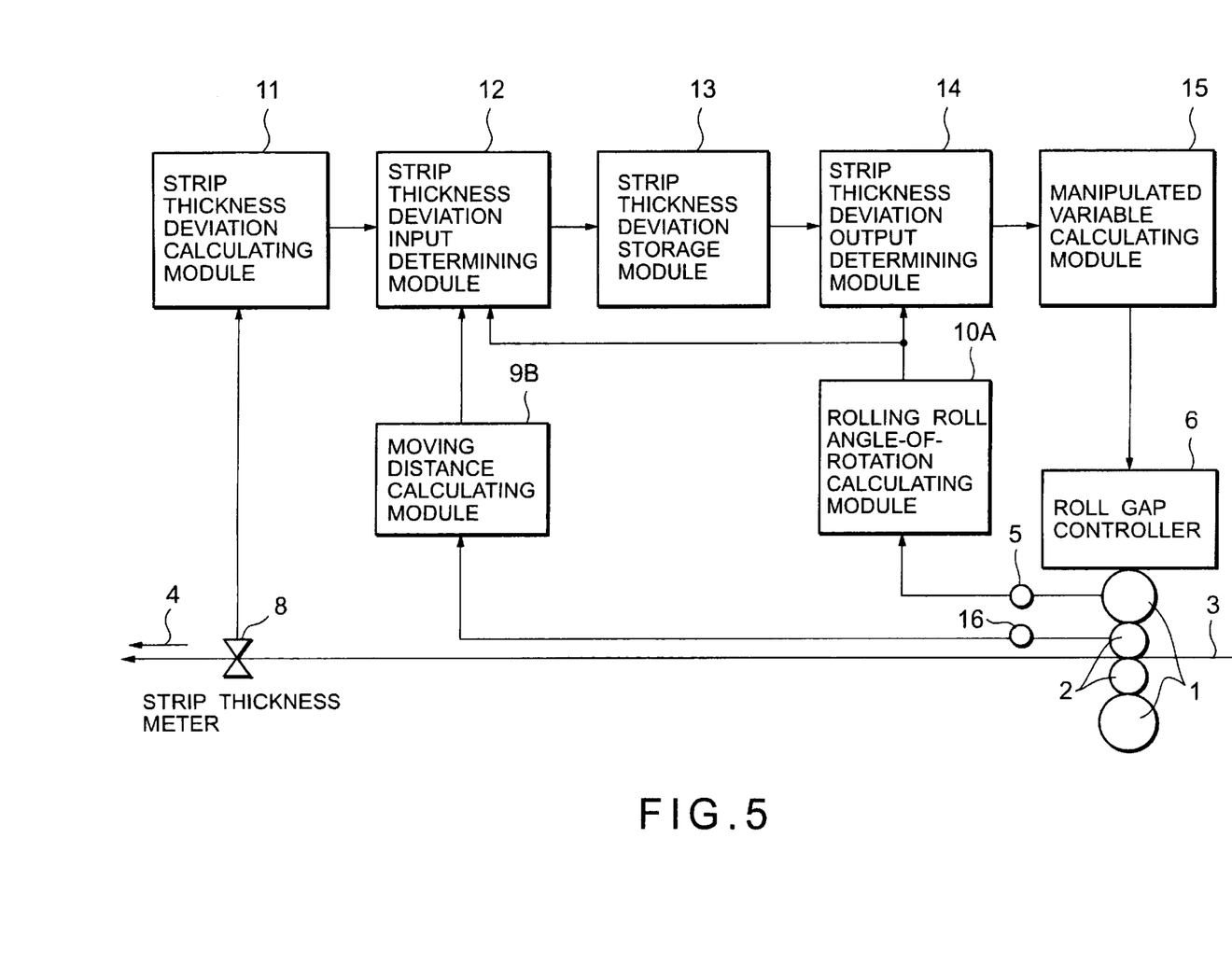
FIG. 5 is a block diagram showing a configuration of the plate thickness control apparatus for the rolling mill in a second embodiment of the present invention, in combination with the rolling mill defined as an application target.

FIG. 5 is a block diagram showing a construction of the strip thickness control apparatus for the rolling mill in a second embodiment of the present invention, in combination with the rolling mill defined as an application target. In FIG. 5, the same components as those in FIG. 1 are marked with the same numerals, of which the repetitive explanations are omitted. A contrivance of the second embodiment is that if the strip speed meter 7 shown in FIG. 1 is not provided on the delivery side of the rolling mill or can not be used because of a fault, etc, on condition that the angle-of-rotation detector 16 is attached to the work roll 2 or to the electric motor directly connected to the work roll 2, the moving distance calculating module 9B, based on a detected value of this angle-of-rotation detector 16, obtains a moving distance of the strip 3.

In this case, the moving distance calculating module 9B calculates the moving distance of the strip 3 in the basis of the detected value of the angle-of-rotation detector 16, the diameter of the work roll 2 and the forward slip in the following formulae:

$$\Delta L = \Delta \theta_{WR} \cdot \frac{D_{WR}}{2} \cdot (1+f) \quad (18)$$

Or $$\Delta L = \Delta \theta_{MO} \cdot G \cdot \frac{D_{WR}}{2} \cdot (1+f) \quad (19)$$

where $\Delta \theta_{WR}$ is an angle [rad] through which the work roll rotates at one calculation cycle, $D_{WR}$ is a diameter [mm] of the work roll, f is a forward slip [-], $\Delta \theta_{MO}$ is an angle [rad] through which the electric motor rotates at one calculation cycle, and G is a gear ratio of a gear device for connecting the electric motor with the work roll.

Thus, in accordance with the second embodiment illustrated in FIG. 5, it is also possible to reduce the influence of the roll eccentricity upon the strip thickness and further to correspond to the change in the roll so eccentricity that might occur as the rolling process advances.

Figure 6:
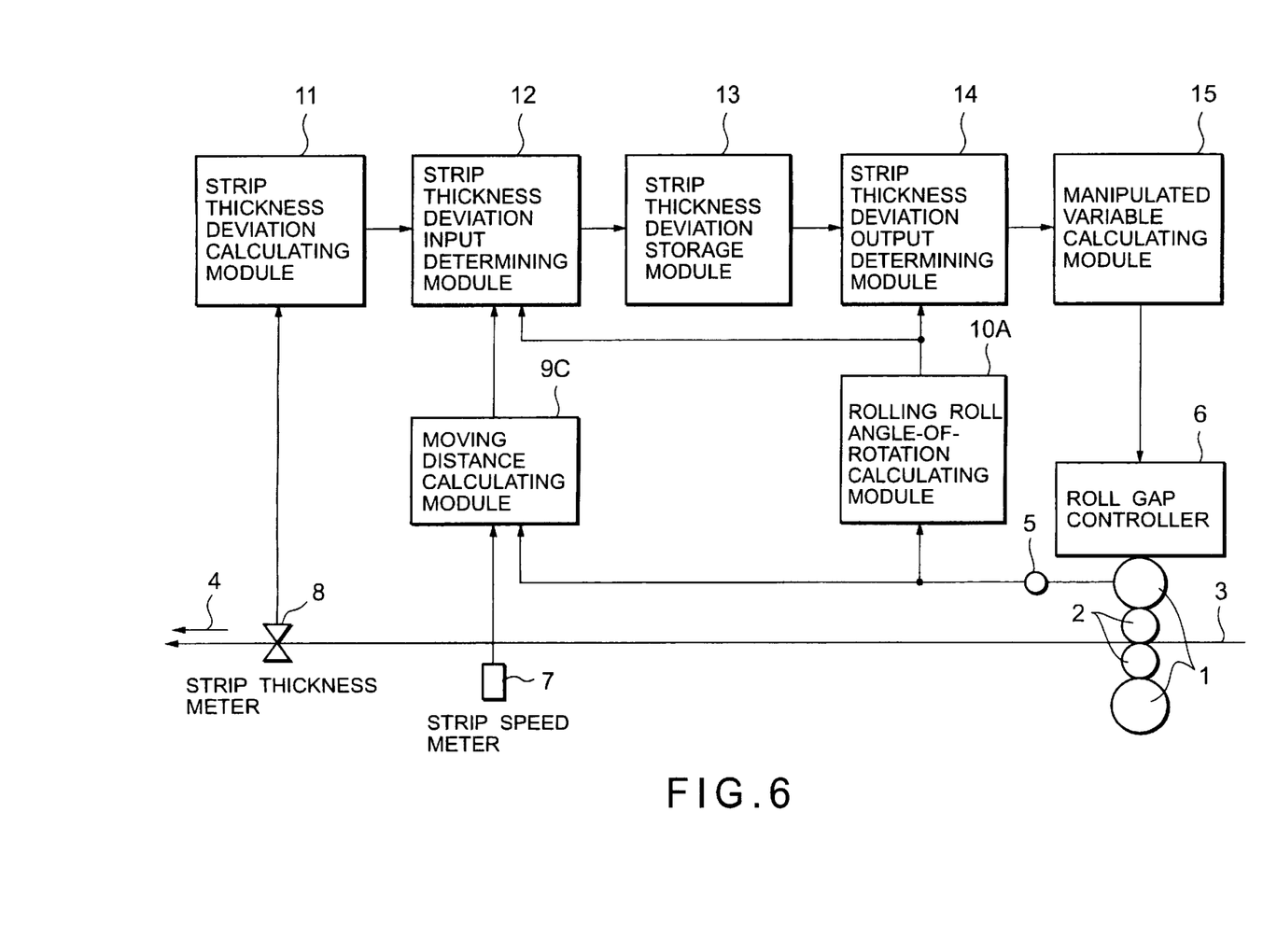
FIG. 6 is a block diagram showing a configuration of the plate thickness control apparatus for the rolling mill in a third embodiment of the present invention, in combination with the rolling mill defined as an application target.

FIG. 6 is a block diagram showing a construction of the strip thickness control apparatus for the rolling mill in a third embodiment of the present invention, in combination with the rolling mill defined as an application target. In FIG. 6, the same components as those in FIG. 1 are marked with the same numerals, of which the repetitive explanations are omitted. In the third embodiment, a function of checking a result of the calculation is given to the moving distance calculating module 9C. In this case, an output signal of the angle-of-rotation detector 5 is supplied to the moving distance calculating module 9C. Then, the moving distance calculating module 9C is capable of judging that the backup roll 1 makes one rotation, for instance, a rotation from the fiducial point to the fiducial point. Based on this signal, the moving distance calculating module 9C calculates, in the following formula (20), a distance at which the strip 3 moves during one rotation of the backup roll 1 by use of the moving distance ΔL obtained by any on of the methods shown in the formulae (1), (18) and (19).

$$L^{CAL} = \Sigma \Delta L \quad (20)$$

where $L^{CAL}$ is a moving distance calculated value [mm] of the strip during one rotation of the backup roll, Σ is an addition during one rotation of the backup roll, and ΔL is a moving distance of the strip at one calculation cycle.

On the other hand, the distance at which the strip 3 moves during one rotation of the backup roll 1 is theoretically obtained such as:

$$L^{THE} = \pi \cdot D_{BUR} \cdot (1+f) \quad (21)$$

where $L^{THE}$ is a theoretical value [mm] of the moving distance of the strip during one rotation of the backup roll, $D_{BUR}$ is a diameter [mm] of the backup roll, and f is a forward slip [-].

If the calculated value obtained by the formula (20) given above neither coincides with the theoretical value obtained by the formula (21) nor falls within a range of some degree, this implies that there must be a large error in the strip speed meter 7 or an angle-of-rotation detector 16. In such a case, the control should be stopped. The moving distance calculating module 9 judges based on the following formula whether the control is stopped or not.

$$a^{LL} < \frac{L^{CAL}}{L^{THE}} < a^{UL} \quad (22)$$

where $a^{LL}$ is a lower limit value [-], and $a^{UL}$ is an upper limit value [-].

Thus, in accordance with the third embodiment illustrated in FIG. 6, it is feasible to reduce the influence of the roll eccentricity upon the strip thickness and further to correspond to the change in the roll eccentricity that might occur as the rolling process advances. In addition, there is obtained an effect in which a decline of the control accuracy due to a miscalculation of the moving distance, of the strip can be prevented.

Figure 7:
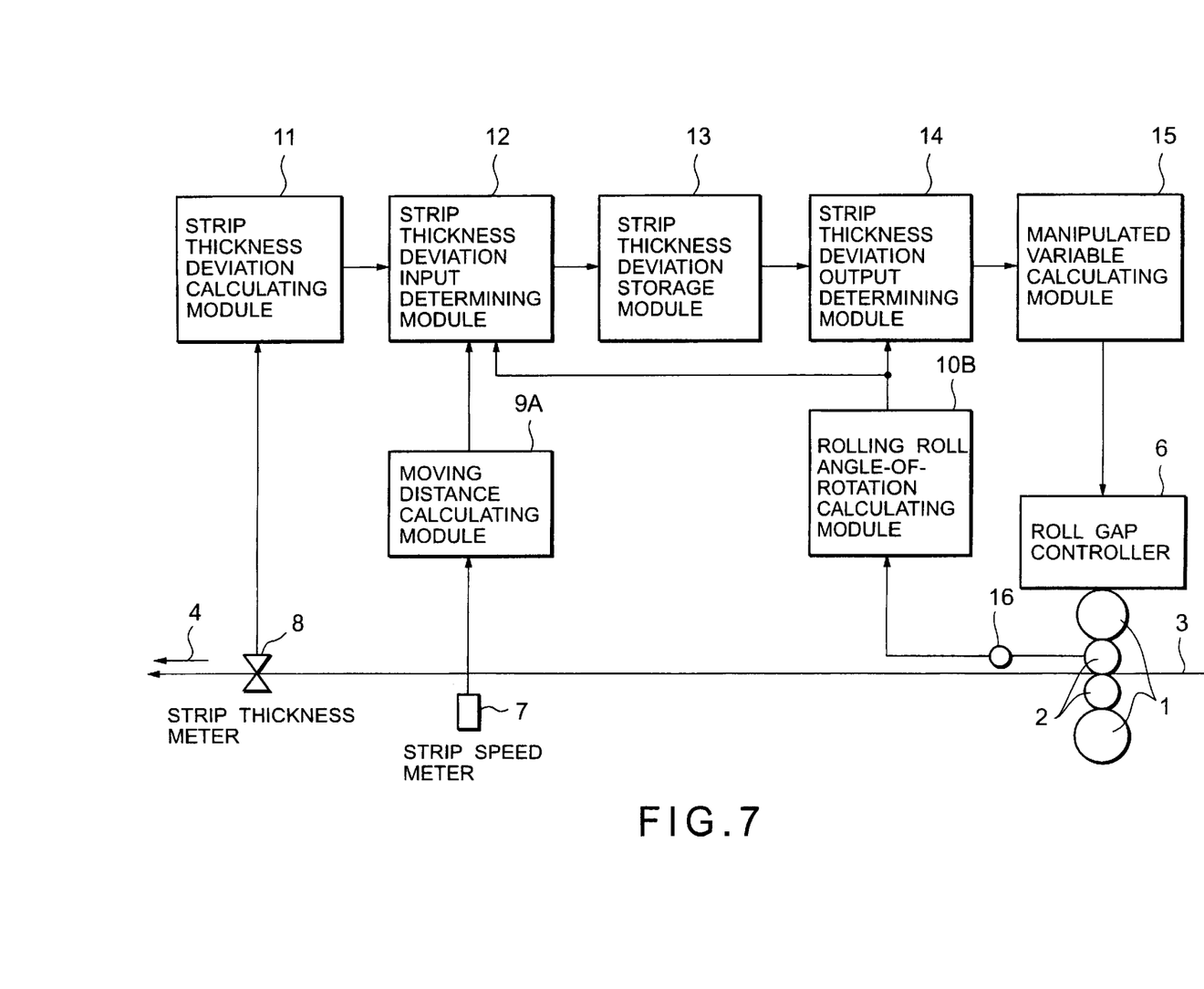
FIG. 7 is a block diagram showing a configuration of the plate thickness control apparatus for the rolling mill in a fourth embodiment of the present invention, in combination with the rolling mill defined as an application target.

FIG. 7 is a block diagram showing a construction of the strip thickness control apparatus for the rolling mill in a fourth embodiment of the present invention, in combination with the rolling mill defined as an application target. In FIG. 7, the same components as those in FIG. 1 are marked with the same numerals, of which the repetitive explanations are omitted. A contrivance of the fourth embodiment is that when providing the angle-of-rotation detector 16 capable of detecting an angle of rotation of the work roll 2 or of the electric motor connected directly to the work roll 2, the rolling roll angle-of-rotation calculating module 10B, based on an output of this angle-of-rotation detector 16, calculates an angle of rotation of the backup roll. In this case, the rolling roll angle-of-rotation calculating module 10B calculates the angle of rotation of the backup roll 1 in the following formulae:

$$\theta_{BUR} = \theta_{WR}^{CAL} \cdot \frac{D_{WR}}{D_{BUR}} \quad (23)$$

or $$\theta_{BUR} = \theta_{MO}^{CAL} \cdot G \cdot \frac{D_{WR}}{D_{BUR}} \quad (24)$$

where $\theta_{BUR}$ is an angle [rad] of rotation of the backup roll, and $\theta_{WR}^{CAL}$ is an angle [rad] of the rotation of the work roll, $D_{WR}$ is a diameter [mm] of the work roll, $D_{BUR}$ is a diameter of the backup roll, $\theta_{MO}^{CAL}$ is an angle [rad] of the rotation of the electric motor, and G is a gear ratio of the gear device for connecting the electric motor to the work roll.

Herein, the angle $\theta_{WR}^{CAL}$ of rotation of the work roll 2 or the angle $\theta_{MO}^{CAL}$ of rotation of the electric motor is cleared each time the backup roll 1 makes one rotation, and represents the angle of rotation of the work roll 2 or the electric motor from a point of time when cleared.

Thus, in accordance with the fourth embodiment illustrated in FIG. 7, in the case of providing the angle-of-rotation detector 16 capable of detecting the angle of rotation of the work roll 2 or of the electric motor connected directly to the work roll 2, the angle of rotation of the backup roll is detected by use of this detector 16, thereby making it possible to reduce the influence of the roll eccentricity upon the strip thickness and further to correspond to the change in the roll eccentricity that might occur as the rolling process advances.

Figure 8:
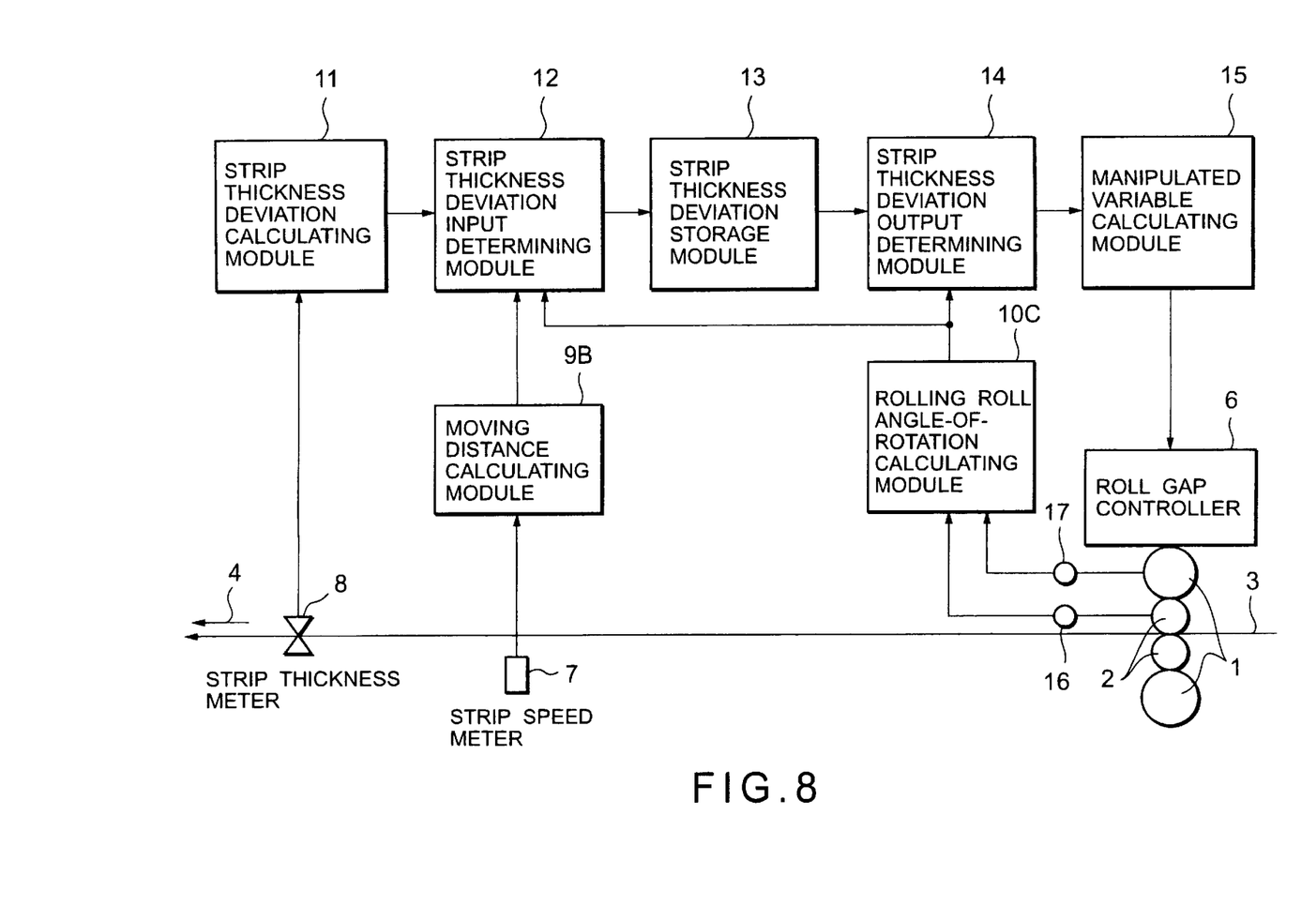
FIG. 8 is a block diagram showing a configuration of the plate thickness control apparatus for the rolling mill in a fifth embodiment of the present invention, in combination with the rolling mill defined as an application target.

FIG. 8 is a block diagram showing a construction of the strip thickness control apparatus for the rolling mill in a fifth embodiment of the present invention, in combination with the rolling mill defined as an application target. In FIG. 8, the same components as those in FIG. 1 are marked with the same numerals, of which the repetitive explanations are omitted. A contrivance of the fifth embodiment is, if the angle of rotation of the backup roll 1 is not directly detected, to correspond to an occurrence of difference from a true angle of rotation of the backup roll 1 due to errors in the diameters of the backup roll 1 and of the work roll 2.

Then, in the fifth embodiment, there is provided a fiducial point detector 17 such as a proximity switch for detecting a specified angle of the backup roll 1, e.g., the fiducial point in FIG. 2, and a rolling roll angle-of-rotation calculating module 10C, based on an output of this fiducial point detector 17, implements learning of the calculation of the angle of rotation of the backup roll 1. A variety of learning methods may be considered, however, the angle of rotation of the backup roll 1 is calculated by use of a learning coefficient in the following formulae:

$$z[r] = z[r-1] + \beta \cdot \Delta z \quad (25)$$

$$\Delta z = \frac{\theta_{BUR}^{R} - 2 \cdot \pi}{2 \cdot \pi} \quad (26)$$

where $z[r]$ is a learning coefficient [-] after r-rotations of the backup roll, $\beta$ is a learning rate [-], $\Delta z$ is an error rate [-] at the r-th rotation of the backup roll, and $\theta_{BUR}^{R}$ is an angle of rotation [rad] of the backup roll during a detection of the fiducial point at the r-th rotation of the backup roll.

At this time, the angle-of-rotation $\theta_{BUR}^{L}$ of the backup roll 1 is calculated by use of the learning coefficient in the following formula:

$$\theta_{BUR}^{L} = \theta_{BUR} \cdot \frac{1}{1 + z[r]} \quad (27)$$

Thus, according to the fifth embodiment illustrated in FIG. 8, even if there might be the possibility of causing the difference from the true angle of rotation of the backup roll when the angle of rotation of the backup roll is not directly detected, this difference is corrected by the formula (27). It is therefore possible to reduce the influence of the roll eccentricity upon the strip thickness and further to correspond to the change in the roll eccentricity that might occur as the rolling process advances.

Note that the delay in the measurement of the strip thickness gauge 8 and the delays in the signal transmission and in the calculation, are compensated by the strip thickness deviation input determining module 12, and the response delay of the roll gap controller 6 is compensated by the strip thickness deviation output determining module 14 in the respective embodiments discussed above. The same effects as those explained above are, however, obtained by such a method that the strip thickness deviation input determining module 12 compensates the delay in the measurement of the strip thickness gauge 8, and the strip thickness deviation output determining module 14 compensate the response delay of the roll gap controller 6 and the delays in the signal transmission and in the calculation.

Further, even when the strip thickness deviation input determining module 12 compensates batchwise the delay in the measurement of the strip thickness gauge 8, the response delay of the roll gap controller 6 and the delays in the signal transmission and in the calculation, or even when the strip thickness deviation output determining module 14 compensates batchwise the delay in the measurement of the strip thickness gauge 8, the response delay of the roll gap controller 6 and the delays in the signal transmission and in the calculation, the same effects can be obtained. Especially when compensating batchwise those delays, an advantage is that a design of the software can be facilitated.

Moreover, the forward slip f used in the discussion made above is set corresponding to rolling conditions such as a rolling velocity etc and thus used, whereby the accuracy can be further enhanced.

What is claimed is:

1. A strip thickness control apparatus for a rolling mill, comprising:
    a strip thickness gauge, provided on a delivery side of said rolling mill, for measuring a thickness of a strip;
    moving distance calculating means for calculating a moving distance of the strip from said rolling mill;
    rolling roll angle-of-rotation calculating means for calculating an angle of rotation of said rolling roll;
    strip thickness deviation calculating means for calculating a deviation between a strip thickness target value and the value of the strip thickness measured by said strip thickness gauge;
    strip thickness deviation storage means for storing the strip thickness deviation by adding it for every angle of rotation of said rolling roll;
    strip thickness deviation input determining means for determining an input timing for inputting the strip thickness deviation to said strip thickness deviation storage means on the basis, of the moving distance of the strip and the angle of rotation of said rolling roll, said strip thickness deviation input determining means determining the input timing by compensating for a delay in the measurement by said strip thickness gauge and delays in signal transmission and in calculation;
    strip thickness deviation output determining means for determining an output timing for outputting the strip thickness deviation stored in said strip thickness deviation storage means on the basis of the angle of rotation of said rolling roll, said strip thickness deviation output determining means determining the output timing by compensating for a response delay of a roll gap controller; and
    manipulated variable calculating means for fetching the strip thickness deviation stored in said strip thickness deviation storage means at the output timing determined by said strip thickness deviation output determining means, and determining a manipulated variable of the roll gap controller of said rolling mill, which eliminates the strip thickness deviation.

2. A strip thickness control apparatus for a rolling mill, comprising:
    a strip thickness gauge, provided on a delivery side of said rolling mill, for measuring a thickness of a strip;
    moving distance calculating means for calculating a moving distance of the strip from said rolling mill;
    rolling roll angle-of-rotation calculating means for calculating an angle of rotation of said rolling roll;
    strip thickness deviation calculating means for calculating a deviation between a strip thickness target value and the value of the strip thickness measured by said strip thickness gauge;
    strip thickness deviation storage means for storing the strip thickness deviation by adding it for every angle of rotation of said rolling roll;
    strip thickness deviation input determining means for determining an input timing for inputting the strip thickness deviation to said strip thickness deviation storage means on the basis of the moving distance of the strip and the angle of rotation of said rolling roll, said strip thickness deviation input determining means determining the input timing by compensating for the delay in the measurement by said strip thickness gauge;
    strip thickness deviation output determination means for determining an output timing for outputting the strip thickness deviation stored in said strip thickness deviation storage means on the basis of the angle of rotation of said rolling roll, said strip thickness deviation output determining means determining the output timing by compensating for the response delay of a roll gap controller and the delays in the signal transmission and in the calculation; and
    manipulated variable calculating means for fetching the strip thickness deviation stored in said strip thickness deviation storage means at the output timing determined by said strip thickness deviation output determining means, and determining a manipulated variable of the roll gap controller of said rolling mill, which eliminates the strip thickness deviation.

3. A strip thickness control apparatus for a rolling mill, comprising:
    a strip thickness gauge, provided on a delivery side of said rolling mill, for measuring a thickness of a strip;
    moving distance calculating means for calculating a moving distance of the strip from said rolling mill;
    rolling roll angle-of-rotation calculating means for calculating an angle of rotation of said rolling roll;
    strip thickness deviation calculating means for calculating a deviation between a strip thickness target value and the value of the strip thickness measured by said strip thickness gauge;
    strip thickness deviation storage means for storing the strip thickness deviation by adding it for every angle of rotation of said rolling roll;
    strip thickness deviation input determining means for determining an input timing for inputting the strip thickness deviation to said strip thickness deviation storage means on the basis of the moving distance of the strip and the angle of rotation of said rolling roll, said strip thickness deviation input determining means determines the input timing by compensating for the delay in the measurement by said strip thickness gauge, the delays in the signal transmission and in the calculation, and the response delay of a roll gap controller;
    strip thickness deviation output determining means for determining an output timing for outputting the strip thickness deviation stored in said strip thickness deviation storage means on the basis of the angle of rotation of said rolling roll; and
    manipulated variable calculating means for fetching the strip thickness deviation stored in said strip thickness deviation storage means at the output timing determined by said strip thickness deviation output determining means, and determining a manipulated variable of the roll gap controller of said rolling mill, which eliminates the strip thickness deviation.

4. A strip thickness control apparatus for a rolling mill, comprising:
    a strip thickness gauge, provided on a delivery side of said rolling mill, for measuring a thickness of a strip;

moving distance calculating means for calculating a moving distance of the strip from said rolling mill;

rolling roll angle-of-rotation calculating means for calculating an angle of rotation of said rolling roll;

strip thickness deviation calculating means for calculating a deviation between a strip thickness target value and the value of the strip thickness measured by said strip thickness gauge;

strip thickness deviation storage means for storing the strip thickness deviation by adding it for every angle of rotation of said rolling roll;

strip thickness deviation input determining means for determining an input timing for inputting the strip thickness deviation to said strip thickness deviation storage means on the basis of the moving distance of the strip and the angle of rotation of said rolling roll;

strip thickness deviation output determining means for determining an output timing for outputting the strip thickness deviation stored in said strip thickness deviation storage means on the basis of the angle of rotation of said rolling roll, said strip thickness deviation output determining means determining the output timing by compensating for the delay in the measurement by said strip thickness gauge, the delays in the signal transmission and in the calculation, and the response delay of a roll gap controller; and manipulated variable calculating means for fetching the strip thickness deviation stored in said strip thickness deviation storage means at the output timing determined by said strip thickness deviation output determining means, and determining a manipulated variable of the roll gap controller of said rolling mill, which eliminates the strip thickness deviation.

5. A strip thickness control apparatus for a rolling mill according to claim 1, further comprising an angle-of-rotation detector for detecting an angle of rotation of said rolling mill, or a fiducial point detector for detecting one rotation of said rolling roll, wherein said moving distance calculating means calculates a moving distance of the strip rolled during one rotation of said rolling roll by use of the angle of rotation measured by said angle-of-rotation detector, and a diameter and a forward slip of said rolling roll, and the control is stopped if a difference between the moving distance obtained by this calculation and the moving distance of the strip during one rotation of said rolling roll, does not fall within a predetermined range.

6. A strip thickness control apparatus for a rolling mill according to claim 1, further comprising an angle-of-rotation detector for detecting an angle of rotation of an electric motor for driving said rolling mill, or detecting an angle of rotation of said rolling roll driven by said electric motor, wherein said rolling roll angle-of-rotation calculating means calculates an angle of rotation of other arbitrary rolling roll by use of the angle of rotation measured by said angle-of-rotation detector, a diameter of said rolling roll of which the angle of rotation has been measured and a diameter of said other arbitrary rolling roll, and sets the angle of rotation of said other arbitrary rolling roll as an angle of rotation of said rolling roll.

7. A strip thickness control apparatus for a rolling mill according to claim 1, wherein said manipulated variable calculating means calculates a manipulated variable of said roll gap controller by use of a coefficient that changes based on an angular speed of said rolling roll.

8. A strip thickness control apparatus for a rolling mill according to claim 1, wherein said manipulated variable calculating means, if the calculated manipulated variable of said roll gap controller is over or under a preset range, sets the manipulated variable to an upper or lower limit value of this range.

9. A strip thickness control apparatus for a rolling mill according to claim 2, further comprising an angle-of-rotation detector for detecting an angle of rotation of said rolling mill, or a fiducial point detector for detecting one rotation of said rolling roll, wherein said moving distance calculating means calculates a moving distance of the strip rolled during one rotation of said rolling roll by use of the angle of rotation measured by said angle-of-rotation detector, and a diameter and a forward slip of said rolling roll, and the control is stopped if a difference between the moving distance obtained by this calculation and the moving distance of the strip during one rotation of said rolling roll, does not fall within a predetermined range.

10. A strip thickness control apparatus for a rolling mill according to claim 2, further comprising an angle-of-rotation detector for detecting an angle of rotation of an electric motor for driving said rolling mill, or detecting an angle of rotation of said rolling roll driven by said electric motor, wherein said rolling roll angle-of-rotation calculating means calculates an angle of rotation of other arbitrary rolling roll by use of the angle of rotation measured by said angle-of-rotation detector, a diameter of said rolling roll of which the angle of rotation has been measured and a diameter of said other arbitrary rolling roll, and sets the angle of rotation of said other arbitrary rolling roll as an angle of rotation of said rolling roll.

11. A strip thickness control apparatus for a rolling mill according to claim 2, wherein said manipulated variable calculating means calculates a manipulated variable of said roll gap controller by use of a coefficient that changes based on an angular speed of said rolling roll.

12. A strip thickness control apparatus for a rolling mill according to claim 2, wherein said manipulated variable calculating means, if the calculated manipulated variable of said roll gap controller is over or under a preset range, sets the manipulated variable to an upper or lower limit value of this range.

13. A strip thickness control apparatus for a rolling mill according to claim 3, further comprising an angle-of-rotation detector for detecting an angle of rotation of said rolling mill, or a fiducial point detector for detecting one rotation of said rolling roll, wherein said moving distance calculating means calculates a moving distance of the strip rolled during one rotation of said rolling roll by use of the angle of rotation measured by said angle-of-rotation detector, and a diameter and a forward slip of said rolling roll, and the control is stopped if a difference between the moving distance obtained by this calculation and the moving distance of the strip during one rotation of said rolling roll, does not fall within a predetermined range.

14. A strip thickness control apparatus for a rolling mill according to claim 3, further comprising an angle-of-rotation detector for detecting an angle of rotation of an electric motor for driving said rolling mill, or detecting an angle of rotation of said rolling roll driven by said electric motor, wherein said rolling roll angle-of-rotation calculating means calculates an angle of rotation of other arbitrary rolling roll by use of the angle of rotation measured by said angle-of-rotation detector, a diameter of said rolling roll of which the angle of rotation has been measured and a diameter of said other arbitrary rolling roll, and sets the angle of rotation of said other arbitrary rolling roll as an angle of rotation of said rolling roll.

15. A strip thickness control apparatus for a rolling mill according to claim 3, wherein said manipulated variable calculating means calculates a manipulated variable of said roll gap controller by use of a coefficient that changes based on an angular speed of said rolling roll.

16. A strip thickness control apparatus for a rolling mill according to claim 3, wherein said manipulated variable calculating means, if the calculated manipulated variable of said roll gap controller is over or under a preset range, sets the manipulated variable to an upper or lower limit value of this range.

17. A strip thickness control apparatus for a rolling mill according to claim 4, further comprising an angle-of-rotation detector for detecting an angle of rotation of said rolling mill, or a fiducial point detector for detecting one rotation of said rolling roll, wherein said moving distance calculating means calculates a moving distance of the strip rolled during one rotation of said rolling roll by use of the angle of rotation measured by said angle-of-rotation detector, and a diameter and a forward slip of said rolling roll, and the control is stopped if a difference between the moving distance obtained by this calculation and the moving distance of the strip during one rotation of said rolling roll, does not fall within a predetermined range.

18. A strip thickness control apparatus for a rolling mill according to claim 4, further comprising an angle-of-rotation detector for detecting an angle of rotation of an electric motor for driving said rolling mill, or detecting an angle of rotation of said rolling roll driven by said electric motor, wherein said rolling roll angle-of-rotation calculating means calculates an angle of rotation of other arbitrary rolling roll by use of the angle of rotation measured by said angle-of-rotation detector, a diameter of said rolling roll of which the angle of rotation has been measured and a diameter of said other arbitrary rolling roll, and sets the angle of rotation of said other arbitrary rolling roll as an angle of rotation of said rolling roll.

19. A strip thickness control apparatus for a rolling mill according to claim 4, wherein said manipulated variable calculating means calculates a manipulated variable of said roll gap controller by use of a coefficient that changes based on an angular speed of said rolling roll.

20. A strip thickness control apparatus for a rolling mill according to claim 4, wherein said manipulated variable calculating means, if the calculated manipulated variable of said roll gap controller is over or under a preset range, sets the manipulated variable to an upper or lower limit value of this range.

* * * * *